(12) United States Patent
Stefan

(10) Patent No.: US 11,062,437 B2
(45) Date of Patent: Jul. 13, 2021

(54) METHOD FOR MONITORING DAMAGE TO MOTOR VEHICLES

(71) Applicant: FORD GLOBAL TECHNOLOGIES, LLC, Dearborn, MI (US)

(72) Inventor: Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/188,369

(22) Filed: Nov. 13, 2018

(65) Prior Publication Data

US 2019/0147583 A1   May 16, 2019

(30) Foreign Application Priority Data

Nov. 10, 2017   (DE) ..................... 10 2017 220 027.8

(51) Int. Cl.
*G06T 7/00* (2017.01)
*G06Q 30/00* (2012.01)
*G06T 17/20* (2006.01)

(52) U.S. Cl.
CPC .......... *G06T 7/0002* (2013.01); *G06Q 30/00* (2013.01); *G06T 17/20* (2013.01); *G06T 2200/04* (2013.01); *G06T 2200/08* (2013.01); *G06T 2207/10016* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,035,639 B2 | 10/2011 | Witte | |
| 8,892,293 B2 | 11/2014 | Reichel et al. | |
| 10,319,094 B1* | 6/2019 | Chen | ..................... G06T 7/0046 |
| 2008/0183535 A1 | 7/2008 | Kahana | |
| 2012/0076437 A1 | 3/2012 | King | |
| 2015/0106133 A1* | 4/2015 | Smith, Jr. | ............... G06Q 40/08 |
| | | | 705/4 |
| 2015/0112543 A1* | 4/2015 | Binion | ................ G06F 17/5095 |
| | | | 701/32.2 |
| 2016/0034590 A1 | 2/2016 | Endras et al. | |
| 2017/0148102 A1* | 5/2017 | Franke | ................... G06Q 10/20 |
| 2017/0293894 A1* | 10/2017 | Taliwal | ................ G06K 9/6201 |

FOREIGN PATENT DOCUMENTS

| | | |
|---|---|---|
| DE | 202016105450 U1 | 11/2016 |
| EP | 2667335 A1 | 11/2013 |

OTHER PUBLICATIONS

DE Examination Report DE 10 2017 220 027.8 Filed Jul. 18, 2018. 9 pages.
EP Search Report EP 18200569.4. Filed Apr. 4, 2019. 7 Pages.

* cited by examiner

*Primary Examiner* — Edward Martello
(74) *Attorney, Agent, or Firm* — Gregory P. Brown; Brooks Kushman P.C.

(57) ABSTRACT

A system includes a processor configured to instruct image capture of a vehicle from a plurality of predefined perspectives, the perspectives defined to result in images providing a 360 degree capture of a vehicle surface. The processor is also configured to receive a plurality of images, at least one from each perspective, of a vehicle from a mobile device camera. The processor is further configured to build a 3-D model of the vehicle surface from the images and compare the 3-D model to a stored reference model of the vehicle surface in order to recognize damage to the vehicle.

14 Claims, 1 Drawing Sheet

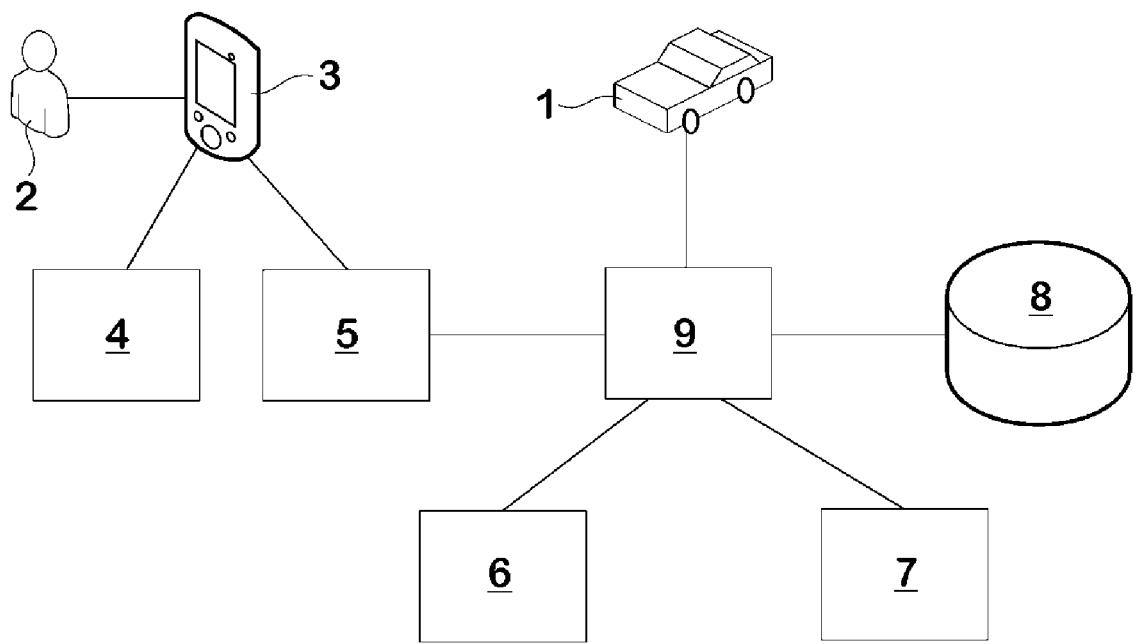

METHOD FOR MONITORING DAMAGE TO MOTOR VEHICLES

CROSS-REFERENCE TO RELATED APPLICATIONS

This application claims foreign priority benefits under 35 U.S.C. § 119(a)-(d) to DE Application 10 2017 220 027.8 filed Nov. 10, 2017, which is hereby incorporated by reference in its entirety.

TECHNICAL FIELD

The illustrative embodiments relate to a method for monitoring damage to a motor vehicle, wherein, using a mobile device that contains a camera, images of the motor vehicle are recorded, from which a current three-dimensional form of the motor vehicle is obtained, which then is compared with a stored reference form of the motor vehicle in order to recognize damage to the motor vehicle.

BACKGROUND

In cities in particular, more and more people are using car sharing offers in order to have a motor vehicle available for shorter journeys and/or times. A car sharing vehicle can be booked quickly and easily by means of a computer or of a mobile device such as a smartphone. Typically, the vehicle renter is guided to a suitable vehicle at a desired or nearest location.

Before the beginning of the journey, the renter may check the condition of the vehicle for damage, in particular the vehicle surfaces that are visible when walking around the vehicle, and the vehicle interior. The renter may compare possible damage with damage recorded in the logbook of the vehicle and, if necessary, communicate with the customer service of the car sharing supplier. To make this easier, external damage recorded in the logbook may be marked with stickers on the vehicle, which may impair the external appearance of the vehicle. In any event, the damage monitoring is time-consuming for the renter, and not always reliable. Damage that is not recorded is often overlooked, which can lead to inconvenience for those involved.

SUMMARY

In a first illustrative embodiment, a system includes a processor configured to instruct image capture of a vehicle from a plurality of predefined perspectives, the perspectives defined to result in images providing a 360 degree capture of a vehicle surface. The processor is also configured to receive a plurality of images, at least one from each perspective, of a vehicle from a mobile device camera. The processor is further configured to build a 3-D model of the vehicle surface from the images and compare the 3-D model to a stored reference model of the vehicle surface in order to recognize damage to the vehicle.

In a second illustrative embodiment, a system includes a processor configured to request a vehicle surface image. The processor is further configured to instruct a position predefined relative to the surface for image obtainment. The processor is additionally configured to determine that a mobile device is at the position and responsively issue an alert. The processor is also configured to receive the image captured from the position via the mobile device. The processor is configured to receive damage indications, determined by comparing the received image to a reference image and display the image on the mobile device, including visually marking damage indications.

In a third illustrative embodiment, a system includes a processor configured to receive a vehicle surface image. The processor is also configured to create a polygon mesh from the image. The processor is further configured to compare the created polygon mesh to a reference polygon mesh to determine differences and identify differences as potential damage to a vehicle surface in the image.

BRIEF DESCRIPTION OF THE DRAWINGS

FIG. 1 shows a damage monitoring system.

DETAILED DESCRIPTION

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

By allowing for dynamic capture and comparison of vehicle surface images to reference images, as well as user guidance to capture such images to ensure appropriate coverage, the illustrative embodiments improve the ability of a vehicle lender to register, track and assign responsibility for vehicle damage. The novel, uncommon and atypical examples and concepts described herein demonstrate potential improvements achievable through use of those examples, concepts, and the like.

In one illustrative embodiment, a motor vehicle is a motor vehicle rented by a user for a period of time, and the user's mobile device includes application software. This software may automatically guide the user or help him regarding how to travel around the vehicle and record images with the mobile device from specific positions/perspectives that show the motor vehicle from all sides, i.e. at least its front, rear, and side surfaces.

Before beginning each journey, when finishing a use of a vehicle, when an impact sensor in the vehicle detects an accident, or when the vehicle renter desires (e.g., because he suspects new damage), the vehicle renter is guided by the app to go around the vehicle and to stand still at particular positions and to record images with the mobile device or its camera that show the vehicle from all directions. The vehicle renter can also be guided regarding how he should orient the mobile device or its camera at the time.

A current, high-resolution, three-dimensional form of the vehicle is then prepared from these images. The current three-dimensional form of the vehicle is then compared with a stored reference form of the vehicle in order to recognize damage, and damage that is recognized is then compared with damage recorded for the vehicle.

An image processing algorithm in particular recognizes external damage to the vehicle and compares this with damage recorded by earlier damage analyses and stored on a cloud server.

The current three-dimensional form of the vehicle can be the vehicle surfaces visible from the various camera positions, but additionally the vehicle interior can also be captured in a similar manner in order to document or assess either its integrity or any damage (e.g., seat damage).

The preparation of the three-dimensional form of the vehicle, its comparison with the reference form, and the damage recognition can either be carried out by the app itself, or by a computer of the car sharing supplier to which the images are uploaded, or through online cooperation between the app and a computer of the car sharing supplier.

An illustrative method allows for recognition of damage to a vehicle systematically and largely automatically and, if necessary, of documenting it automatically. The method can be carried out before and after every vehicle use if desired but is also suitable for the on-site documentation of damage if the car sharing vehicle is involved in an accident.

In one non-limiting example, five or more images, potentially overlapping one another, are recorded from different positions in order to capture the vehicle surface seamlessly. The images can, for example, be taken from the front, rear, left, right and obliquely from above, but they can, for example, also be recorded essentially horizontal from five angular positions approximately equally spaced from one another around the vehicle, in order to achieve a particularly good all-round coverage.

A damage check procedure may be carried out within the framework of the illustrative method, and a damage reporting procedure may also be carried out in the event that damage is recognized. The current three-dimensional form of the motor vehicle can be stored each time damage is recognized, in order to generate a damage history which can also be stored.

A description of an illustrative embodiment on the basis of the drawing follows. The one FIGURE shows an overview of the components of the system for monitoring damage to car sharing vehicles.

The illustrative embodiments allow for the monitoring and recognition of damage on car sharing vehicles or the like, in particular on motor vehicle structures, such as scratches to the paintwork or damage to wheel rims, wheels, bumpers, lighting equipment etc. They make identifying and recording such damage easier and more reliable and make it easier to assign responsibility to the responsible party.

FIG. 1 shows a damage monitoring system including a car sharing vehicle 1, a user 2 and driver of the car sharing vehicle 1, a mobile, intelligent device such as a smartphone 3 of the user 2, a camera 4 installed in the smartphone 3, and an app 5 that is installed in the smartphone 3 and runs on it.

The app 5 is connected to a control server 9, and is configured to guide the user 2 through a damage monitoring procedure which offers two operating modes, A and B.

Operating mode A includes a damage checking procedure that may occur at the beginning of every journey with the vehicle 1 after the user 2 has obtained the vehicle 1. Additionally or alternatively, this process could also occur after each return of the user 2 when he has parked and left the vehicle 1. The damage checking procedure, or the app 5, performs the following illustrative steps, or the like:

The processor may alert the user 2 to start the check, then activate the camera 4 of the smartphone 3 or similar device. The processor may further ask the user 2 to adopt positions (e.g. four, one on each side) around the vehicle 1 in sequence, and in each case to aim the camera 4 at the vehicle 1. The four positions can be in front, behind, to the left-hand side and right-hand side next to the vehicle 1.

Next, the processor may recognize, via the app 5, that the user 2 has reached a correct position, for example making use of sensors of the vehicle 1, image processing, relative position by means of Bluetooth, smartphone-vehicle communication, vehicle key location etc.).

Each time, when the user 2 has reached the corresponding position, the app 5 informs the user 2, for example using vibrations or sounds of the smartphone 3, of this fact, and requests him if necessary to correct the position of the smartphone 3 so that the camera 4 gets a suitable view of the vehicle 1.

When the positions of the user 2 and the camera 4 are correct, the app 5 in each case automatically takes a picture. The processor may then send the images to an image processing algorithm 6 for damage checking. An image of the vehicle roof can also be requested or can be reconstructed from the four previous images.

Operating mode B is a damage reporting procedure. This mode may directly report damage to the vehicle 1, such as when the vehicle 1 was directly involved in an accident, or when the user 2 wants to report new damage immediately.

In addition, it is possible to monitor when the vehicle 1 is parked whether it is subjected to any impact, and the user can, if appropriate, be alerted to start a damage reporting procedure. The damage reporting procedure, or the app 5, may perform the following illustrative steps, or the like:

The user 2 images an affected area of the vehicle and the application may carry out damage assessment processing, as previously discussed, for the affected area.

Additionally, or alternatively, the app 5 may ask the user 2 to mark the location of the damage on the image that has been recorded, e.g. by touching the image at the appropriate place and/or send the image to the image processing algorithm 6.

The image processing algorithm 6 can be a part of the app 5 on the smartphone 3 or can be implemented on a cloud server 8. The image processing algorithm 6 accepts the recorded images of the vehicle 1, reconstructs a 3-D image of the vehicle 1 and, on the basis of this 3-D image, prepares a current polygon mesh of the surface of the vehicle 1 which represents its three-dimensional surface form. The polygon mesh may be fine enough to be able to detect scratches as well.

A damage determination algorithm 7 compares the current polygon mesh processed by the image processing algorithm 6 with a reference polygon mesh. The reference polygon mesh can be an initial polygon mesh of the vehicle 1 as it left the assembly line, or it can be the most recent polygon mesh that has been recorded by a previous damage determination. The reference polygon mesh is typically stored on the cloud server 8.

The damage determination algorithm 7 determines differences between the current polygon mesh and the reference polygon mesh through a 3-D form comparison, and then analyzes the location of the differences, comparing it with a list of known damages and their locations stored on the cloud server 8. Any damage that is not identified in the history data of the vehicle 1 is then identified as new damage and stored on the cloud server 8.

The user 2 can be informed and asked to confirm the damage. The user 2 can also be asked whether he was involved in this damage, in particular when the damage checking procedure has been carried out after the user 2 has parked and left the vehicle 1.

The cloud server 8 may be a car supplier server or that of a damage recording and/or verification service. In one example, the server records the following: the initial polygon mesh of the vehicle 1, a history of all the polygon meshes newly created over the course of time, and a list of all the damages and of their forms and locations in the polygon meshes. If a damaged location is repaired, the lists are appropriately updated, e.g. in that the corresponding recordings are removed or in that the reference polygon mesh is reset to an earlier version without the repaired damage.

The control server 9 coordinates the overall system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
provide instructions to a user smartphone to instruct image capture of a vehicle from a plurality of predefined perspectives, using the smartphone, the perspectives defined to result in images providing a 360 degree capture of a vehicle surface, the instructions telling the user where to stand and how to aim the smartphone to capture each of the images;
receive a plurality of images, at least one from each perspective, of a vehicle captured using the smartphone in accordance with the instructions;
build a 3-D model of the vehicle surface from the images; and
compare the 3-D model to a stored reference model of the vehicle surface in order to recognize damage to the vehicle.

2. The system of claim 1 wherein the processor is further configured to instruct the image capture over a predefined rental period, whenever a vehicle exit- event is detected.

3. The system of claim 1, wherein the predefined perspectives are further defined to include capture of a vehicle roof.

4. The system of claim 1, wherein he processor is further configured to store the current 3-D model each time damage is recognized to generate a damage history which is also stored.

5. The system of claim 1, wherein he processor is further configured to:

detect a vehicle impact event via a vehicle sensor;
determine a vehicle surface affected by the impact event; and
instruct the image capture responsive to the impact event, where in the predefined perspectives include at least a perspective defined to capture the affected vehicle surface.

6. A system comprising:
a smartphone processor configured to:
request a vehicle surface image;
instruct a user of the smartphone as to a smartphone position predefined relative to the surface for image obtainment;
determine that the smartphone is at the position and responsively issue an alert to the user;
receive the image captured from the position via a smartphone camera;
receive damage indications, determined by comparing the received image to a reference image; and
display the image on the smartphone, including visually marking damage indications.

7. The system of claim 6, wherein the vehicle surface image is an exterior surface image.

8. The system of claim 6, wherein the vehicle surface image is an interior surface image.

9. The system of claim 6, wherein the processor is configured to determine that the smartphone is at the position based on communication with vehicle sensors.

10. The system of claim 9, wherein the vehicle sensor detects the smartphone at the position based on an image of a user detected by the sensors.

11. The system of claim 9, wherein the vehicle sensor detects the smartphone at the position based on a short-range wireless communication signal between the vehicle and the mobile device.

12. The system of claim 9, wherein the vehicle sensor detects the smartphone at the position based on a signal between the vehicle and a vehicle key.

13. The system of claim 6, wherein the reference image includes a prior vehicle surface image.

14. The system of claim 6, wherein the reference image includes a predefined stock expected surface image based on a vehicle leaving the assembly line.

* * * * *